(12) United States Patent
Zhiqun et al.

(10) Patent No.: US 9,051,180 B2
(45) Date of Patent: Jun. 9, 2015

(54) METHOD OF CONTROLLING SHAPE OF SYNTHESIZED FERROELECTRIC OXIDE NANOCRYSTAL PARTICLES

(75) Inventors: Lin Zhiqun, Ames, IA (US); Jun Wang, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 1012 days.

(21) Appl. No.: 13/171,021

(22) Filed: Jun. 28, 2011

(65) Prior Publication Data

US 2012/0049113 A1    Mar. 1, 2012

Related U.S. Application Data

(60) Provisional application No. 61/377,477, filed on Aug. 27, 2010.

(51) Int. Cl.
*C01G 23/04* (2006.01)
*C09K 3/00* (2006.01)
*B82Y 40/00* (2011.01)
*B82Y 30/00* (2011.01)

(52) U.S. Cl.
CPC ............... *B82Y 40/00* (2013.01); *B82Y 30/00* (2013.01); *C01P 2002/72* (2013.01); *C01P 2002/85* (2013.01); *C01P 2004/04* (2013.01); *C01P 2004/16* (2013.01); *C01P 2004/32* (2013.01); *C01P 2004/54* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| | | | | |
|---|---|---|---|---|
| 6,962,685 | B2 * | 11/2005 | Sun | 423/632 |
| 7,118,727 | B2 * | 10/2006 | Williams | 423/592.1 |
| 7,128,891 | B1 * | 10/2006 | Sun | 423/511 |
| 7,918,935 | B2 * | 4/2011 | Park et al. | 117/68 |
| 2004/0253174 | A1 * | 12/2004 | Williams | 423/608 |
| 2005/0064731 | A1 * | 3/2005 | Park et al. | 438/800 |
| 2008/0003839 | A1 * | 1/2008 | Park et al. | 438/800 |
| 2010/0031775 | A1 * | 2/2010 | Seo et al. | 75/364 |
| 2010/0135937 | A1 * | 6/2010 | O'Brien et al. | 424/59 |

OTHER PUBLICATIONS

O'Brien, Stephen, et al., "Communications to the Editor: Synthesis of Monodisperse Nanoparticles of Barium Titanate: Toward a Generalized Strategy of Oxide Nanoparticle Synthesis", J. Am. Chem. Soc. 2011, 2001, vol. 123, pp. 12085-12086.

Spanier, Jonathan E., et al., "Ferroelectric Phase Transition in Individual Single-Crystalline BaTiO3 Nanowires", Nano Letters, xxxx, vol. 0, No. 0, A-E, Published on Web Mar. 15, 2006.

Urban, Jeffrey J., et al., "Synthesis of Single-Crystalline Perovskite Nanorods Composed of Barium Titanate and Strontium Titanate", J. Am. Chem. Soc. 2002, vol. 125, No. 7, pp. 1186-1187.

Urban, Jeffrey J., et al., "Single-Crystalline Barium Titanate Nanowires", Advanced Materials 2003, vol. 15, No. 5., pp. 423-426, Mar. 4, 2003.

* cited by examiner

*Primary Examiner* — Joseph D Anthony
(74) *Attorney, Agent, or Firm* — McKee, Voorhees & Sease, PLC

(57) ABSTRACT

Shape controlled synthesis of ferroelectric nanocrystals such as barium titanate ($BaTiO_3$) nanocrystals is described. By tuning the molar ratio between the surfactant and the metal precursors, $BaTiO_3$ nanocrystals with different shapes are readily obtained. This provides the nanoscopic ferroelectric building blocks for the fabrication of various electronic devices, as well as for fundamental research in nanoscience and nanotechnology.

8 Claims, 3 Drawing Sheets

Oleic acid : Metal ions (Ba + Ti) = 32 : 1

Scale bar = 200 nm

METHOD OF CONTROLLING SHAPE OF SYNTHESIZED FERROELECTRIC OXIDE NANOCRYSTAL PARTICLES

CROSS-REFERENCE TO RELATED APPLICATIONS

This application claims priority under 35 U.S.C. §1119 to provisional application Ser. No. 61/377,477 filed Aug. 27, 2010, herein incorporated by reference in its entirety.

GRANT REFERENCE

This invention was made with government support under Grant No. FA9550-09-1-0388 awarded by the U.S. Air Force. The government has certain rights in the invention."

FIELD OF THE INVENTION

This invention relates to shaped nanoparticles of ferroelectric oxides such as barium titanate. This invention should be applicable to electronics industry, including applications in capacitors, pyroelectric detectors, electrooptic modulators, transducers, actuators, optical memories, and nonlinear optics. In addition, this invention could provide nanoscale modules for fundamental studies on nanoscale ferroelectric properties.

BACKGROUND OF THE INVENTION

The physical properties of materials as they progress from the bulk to the nanoscale regime (1-100 nm) continue to be of immense interest and increasing importance for future technological applications. Nanocrystals display properties generally found to be scientifically different from the bulk material or the atomic or molecular species from which they can be derived. Examples of this phenomenon are manifold. The study of semiconductor nanocrystal quantum dots is a well-established field, yielding rich, useful, and application-oriented research. A coherent field of study is currently emerging for the systematic examination of nanocrystals with the aim of producing nanoparticles with narrow size distributions and size tenability in the nanoscale regime. Among the important characteristics of nanoparticle systems are facile manipulation and reversible assembly which allow for the possibility of incorporation of nanoparticles into electric, electronic, or optical devices. Such "bottom up" or "self-assembly" approaches are the benchmark of nanotechnology.

The family of complex ferroelectric oxides such as $BaTiO_3$, $Pb(Zr,Ti)O_3$, and $(Ba,Sr)-TiO_3$ has far reaching applications in the electronics industry for transducers, actuators, and high-k dielectrics. Ferroelectricity is the phenomenon designated to crystals in possession of a spontaneous polarization and hysteresis effects with respect to the dielectric displacement in the presence of an applied electric field. The precise nature of ferroelectricity at the nanoscale, such as critical size dependent suppression in particles and thin films, is much debated in the literature. Ferroelectric oxide nanoparticles with high anisotropic polarizibility offer the possibility of taking advantage of this dielectric property within the context of nanoscale materials science.

Ferroelectric materials display a multitude of peculiar physical effects (e.g., piezoelectric, pyroelectric, and electrooptic). They possess high dielectric constants, relatively low dielectric loss, high electrical resistivity, moderate dielectric breakdown strength, and strong electromechanical and electrooptical behaviors that make them widely used in non-volatile digital memories, thin film capacitors, electronic transducers, actuators, high-k dielectrics, pyroelectric sensors, electrooptic modulators, optical memories, and nonlinear optics. Among various types of ferroelectrics, the perovskite-type with general formula of $ABO_3$, for example barium titanate ($BaTiO_3$), are the most studied ferroelectric oxides.

The use of low-dimensional nanocrystals as building blocks for developing low-cost, miniaturized devices has emerged as an important activity in materials research. The properties of individual building blocks and their arrangement dictate the collective functionalities of resulting devices. In this regard, in order to fabricate nanodevices based on for example ferroelectric $BaTiO_3$ nanocrystals with outstanding physical properties and durability at the nanoscale, it is crucial to control the size and shape of $BaTiO_3$ nanostructures. Various methods have been explored for the synthesis of $BaTiO_3$ nanocrystals.

While much of the current research focuses on the control over the size of $BaTiO_3$ nanocrystals, little work has reported on the shape-controlled synthesis of $BaTiO_3$ nanocrystals despite the fact that they are of key importance for both fundamental studies and engineering applications. Herein, we present, for the first time, a simple and potentially versatile shape-controlled synthesis of $BaTiO_3$ nanocrystals via thermal decomposition. By tuning the ratio of the surfactant to metal precursor in the reaction solution, nanocrystals of different shapes can be readily obtained (e.g., nanomarbles, nanorods and nanowires). The obtained $BaTiO_3$ nanostructures are highly crystalline as revealed by X-ray powder defration (XRD) and high resolution transmission electron microscopy (HR-TEM) studies. (O'Brien, S.; Brus, L., Murray C. B., J. Am. Chem. Soc., 2001, 123:12085-12086; Urban, J. J.; Yun, W. S.; Gu, Q.; Park, H., J. Am. Chem. Soc., 2002, 124:1186-1187; Urban, J. J.; Spanier, J. E.; Lian, O. Y.; Yun, W. S.; Park, H., Adv. Mater., 2003, 15:423-426; Spanier, J. E. et al., Nano Lett., 2006, 6:735-739).

Accordingly, it is a primary objective of the present invention to control the shape of ferroelectric oxide particles selectively so that the reaction produces predominantly at the operator's choice nanomarble shapes, nanorod shapes or nanowire shapes. This has previously been unable to be accomplished as evidenced by the fact that there are no reports in the technical literature to the Applicants' knowledge on shape controlled synthesis of ferric oxide particles in general, and the barium titanate nanocrystals in particular. Thus by using the process of the present invention, a significant step forward is achieved because each of these important shapes can be easily prepared in a robust manner to allow investigation of their individually unique ferroelectric properties. The method of accomplishing this primary objective as well as others will become apparent from the detailed description of the invention which follows hereinafter.

DETAILED DESCRIPTION OF THE PREFERRED EMBODIMENTS

High temperature thermal decomposition is widely recognized as an effective route to functional nanocrystals, including quantum dots, iron oxide nanoparticles, etc., providing good control over the size and shape of nanocrystals. To synthesize $BaTiO_3$ nanocrystals, a commercially available Ba—Ti alkoxide precursor, barium titanium ethyl hexano-isopropoxide, was thermally decomposed in high boiling point solvent, 1-octadecene, with the use of oleic acid as a surface stabilizing agent. Shape control over the $BaTiO_3$ nanocrystals was achieved by simply tuning the molar ratio of the oleic acid surfactant to Ba—Ti precursor in the reaction solution.

Figure 1:
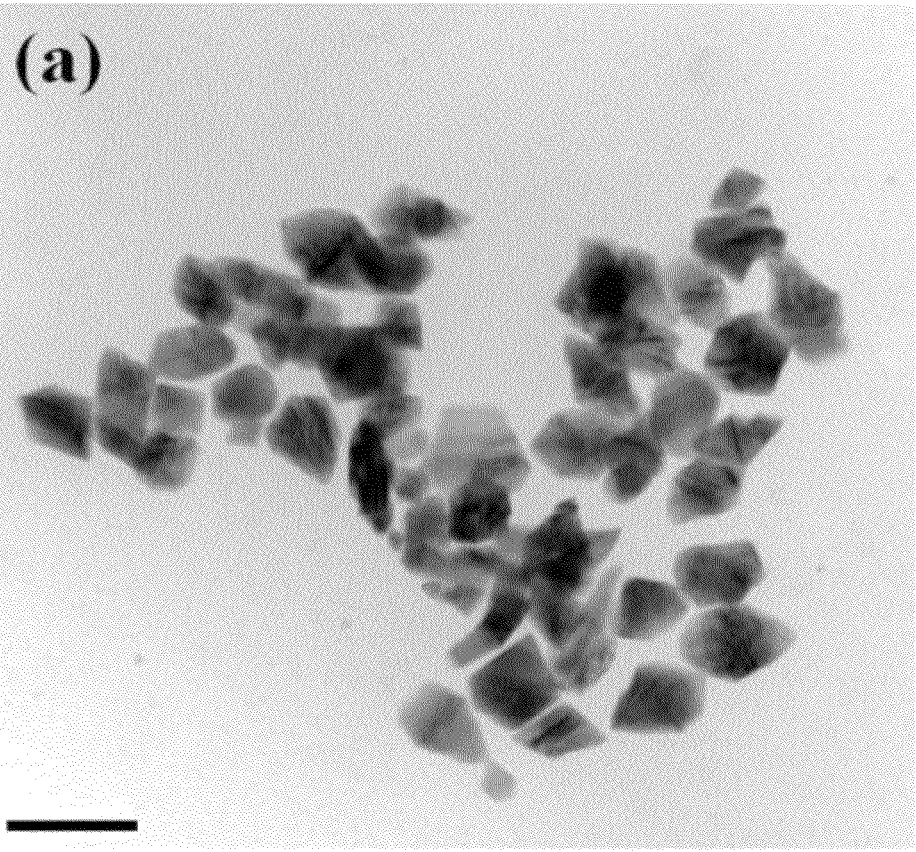
FIG. 1 shows marble shaped barium titanate particles where an example is run with the oleic acid to metal alkoxide precursor ratio of 8:1.
Figure 1:
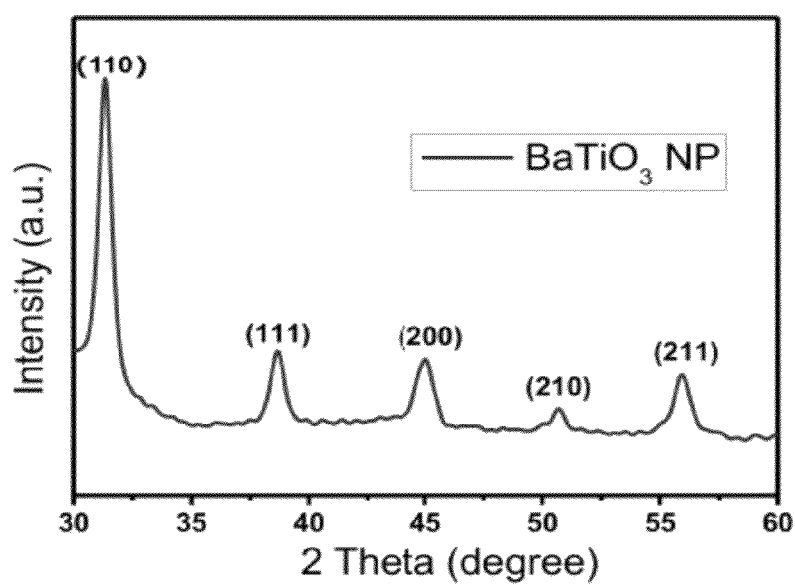
Figure 2:
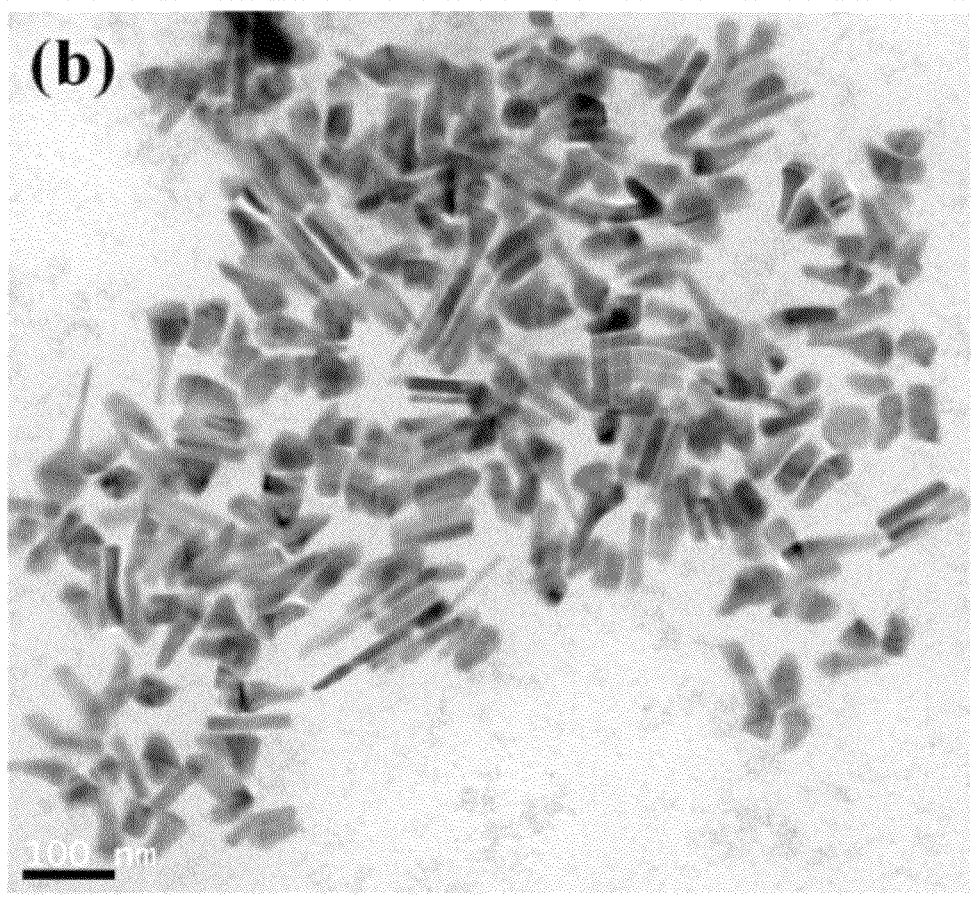
FIG. 2 shows a preparation where the oleic acid to metal alkoxide precursor ratio is 16:1.
Figure 2:
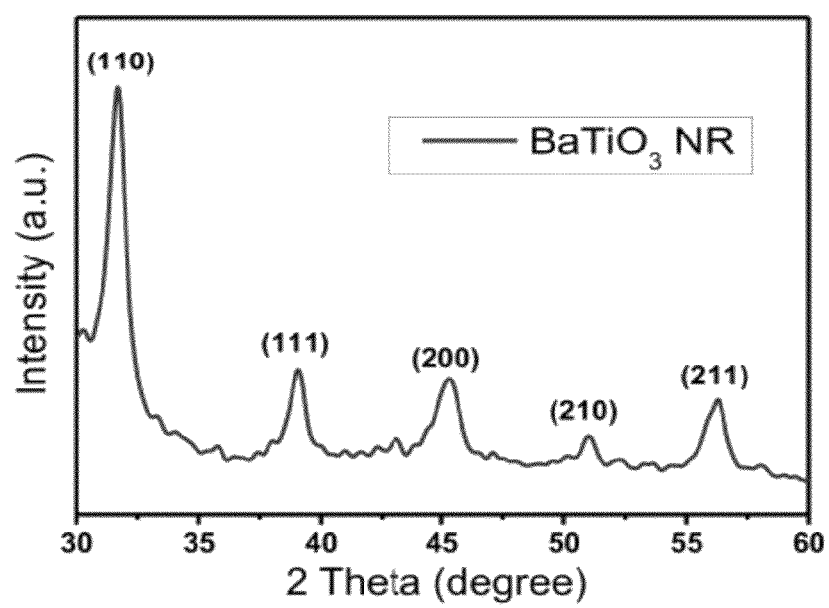
Figure 3:
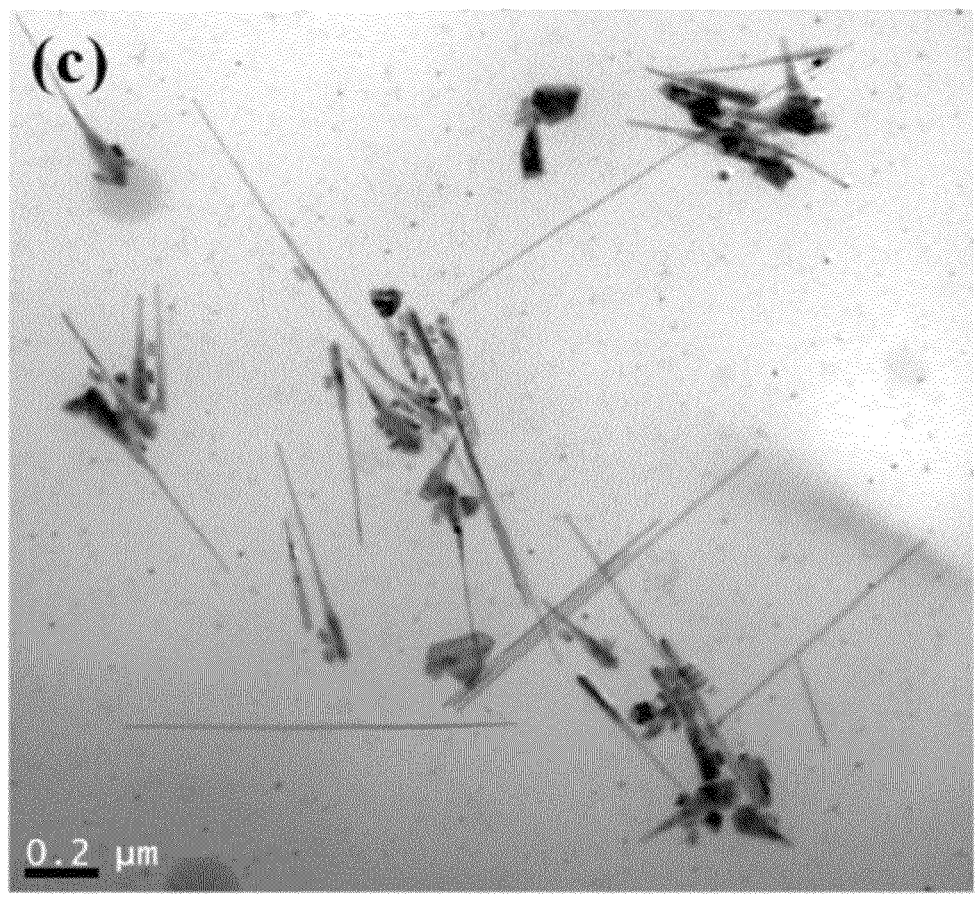
FIG. 3 shows particle formation where the oleic acid to metal alkoxide precursor ratio is 32:1.
Figure 3:
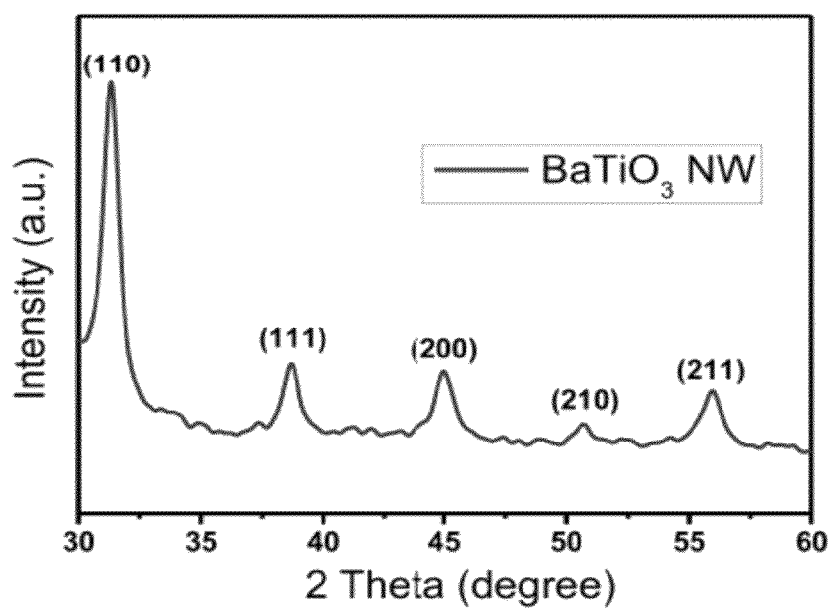

FIGS. 1-3 show the TEM images of as-synthesized $BaTiO_3$ nanocrystals and the corresponding XRD pattern. Individual nanocrystals are clearly evident in the transmission electron micrographs, from which the size and morphology of nanocrystals can be analyzed and summarized in Table 1 below. Under the same experimental conditions, the morphology of $BaTiO_3$ nanocrystals was found to be governed by the molar ratio of oleic acid to Ba—Ti precursor. At the ratio of 8, 16, and 32, $BaTiO_3$ nanomarbles, nanorods, and nanowires were obtained, respectively. Such correlation between the surfactant to metal precursor ratio and the nanocrystals morphology was in good agreement with other work on the nanocrystals synthesis. While not wishing to be bound by theory, the possible mechanism for the evolution of different $BaTiO_3$ morphologies may be understood as follows. The nanocrystals are formed under an inverse micelle condition, i.e., polar surfactant, oleic acid in non-polar solvent, 1-octadecene. When the ratio is low (i.e., oleic acid:Bai-Ti precursor=8:1), large size (>100 nm) inverse micelles are formed, resulting in large free space for the crystal growth in inverse micelles; the crystals can thus grow in a less facet-preferred manner. Consequently, large nanomarbles are yielded after thermal decomposition of the Ba—Ti precursor (FIG. 1a). With the increased ratio (i.e., oleic acid:Ba—Ti precursor=16:1 and 32:1), the size of inverse micelles decreases, which results in less free space for the crystal growth; and the growth of crystals is compressed. Therefore the diameter of the nanocrystals decreases compared to the case of the 8:1 ratio (table 1). The diffusion rate of Ba—Ti precursor from the bulk solution into inverse micelles can be considered constant, as the concentration of Ba—Ti precursor was maintained the same in all cases. The growth of nanocrystals along <100> direction is preferred due to the higher facet reactivity while the growth of other facets is compressed, thereby leading to increased aspect ratios of resulting $BaTiO_3$ nanocrystals, forming nanorods (FIG. 1b) and nanowires (FIG. 1c). The chemical composition of assynthesized nanocrystals was confirmed by energy dispersive X-ray (EDX) microanalysis, showing that the Ba to Ti ratio is 1.

The crystalline nature of as-synthesized nanocrystals was examined by XRD and HR-TEM measurements. XRD was performed with Cu K$\alpha$ radiation ($\lambda$=1.54 Å); the samples were prepared by drop-casting concentrated $BaTiO_3$ toluene solution on a Si (111) substrate. FIG. 1d shows the XRD patterns of $BaTiO_3$ nanocrystals, can be indexed as cubic $BaTiO_3$ (PDF #00-005-0626). HR-TEM characterization revealed that as-synthesized nanostructured $BaTiO_3$ is highly crystalline, and with increased concentration of oleic acid, the nanocrystals preferentially grow along <100> axis.

The appropriate conditions for the preparation of highly crystalline $BaTiO_3$ were determined via systematic studies on the refluxing time and the ratio of the surfactant to metal precursor. Time-dependent study shows that a certain length of refluxing period (i.e., ~12 hrs) was required to produce $BaTiO_3$ nanocrystals. This can be attributed to the fact that our method is absolutely water-free and the thermal decomposition rate of the Ba—Ti precursor is slow under the present conditions, while the precursor is highly moisture sensitive. It is noteworthy that a much longer reaction time did not seem to obviously increase the size and shape of $BaTiO_3$ nanocrystals. In order to explore the effect of the surfactant to metal precursor ratio on the formation of $BaTiO_3$ nanocrystals, a series of reactions were performed with the amount of oleic acid varying from 0.05 mmol to 6.4 mmol while the Ba—Ti precursor were maintained at 0.2 mmol. A minimum of 1.2 mmol oleic acid was found necessary to produce $BaTiO_3$ nanocrystals based on the TEM measurement, corresponding to a surfactant to metal precursor ratio of 6. When the ratio was less than 6, the reaction solution remained transparent after long-time refluxing and no nanocrystals were obtained. With the 1.2 mmol surfactant, highly crystalline $BaTiO_3$ nanocrystals started to form and the morphologies could be controlled.

The surface stabilizing agent can be selected from a variety of fatty acid derived surfactants such as oleic acid and steric acid. Oleic acid is preferred.

The ferroelectric oxide can be selected from the group consisting of $BaTiO_3$, $Pb(Zr,Ti)O_3$ and $(Ba,Sr)—TiO_3$. The preferred ferroelectric oxide is barium titanate. The metal alkoxide precursor can be a variety of known precursors for barium titanate. The preferred barium metal oxide precursor is barium titanium ethyl hexano-isopropoxide.

The reaction is preferably run in an organic solvent. The presence of an inert gas atmosphere such as argon or nitrogen. A suitable solvent is known to one skilled in the art and can, for example, be 1-octadecene as used in the following example which is offered to further illustrate, but not limit the process of the present invention.

EXAMPLE

In a typical synthesis of $BaTiO_3$ nanocrystals, 1.6 mmol oleic acid (Tech. 90%, Alfa Aesar) and 10 ml 1-octadecene (Tech. 90%, Sigma Aldrich) were mixed in a three-neck flask with magnetic stirring and heated to 100° C. for 30 min. Vacuum was applied to remove trace water; the whole system was protected with a dry Ar atmosphere. The solution was cooled down to 80° C.; subsequently, 1 ml barium titanium ethyl hexano-isopropoxide (13% isopropanol solution; equals to 0.2 mmol metal precursor) was injected quickly, followed by heating to 100° C. Isopropanol was then removed by vacuum. All chemicals were used as received without further purification.

Under the Ar protection, the light yellowish transparent reaction solution was heated to reflux for 24 hrs, resulting in a turbid mixture. After the reaction system was cooled to 100°

TABLE 1

The dimension of $BaTiO_3$ nanocrystals and their dependence on the ratio between the surfactant, oleic acid and the metal precursor, barium titanium ethyl hexanoisopropoxide. Data was obtained by analyzing the corresponding TEM images.

| | $BaTiO_3$ Nanomarbles | $BaTiO_3$ Nanorods | $BaTiO_3$ Nanowires |
|---|---|---|---|
| Surfactant:Metal Precursor (molar ratio) | 8:1 | 16:1 | 32:1 |
| Average Diameter (D. nm) | 133 | 14 | 15 |
| Average Length (L. nm) | N/A | 98 | 646 |
| Aspect Ratio (AR, L:D) | 1 | 7 | 43 |

C., large amount of ethanol was added to the turbid solution. The precipitates were separated by centrifuge and re-dissolved in toluene. BaTiO$_3$ nanorods and nanowires were obtained by varying the amount of oleic acid, e.g., 3.2 mmol of oleic acid for nanorods and 6.4 mmol of oleic acid for nanowires, while the other experimental conditions remained same.

Transmission electron microscopy (TEM; JEOL 2100, operated at 200 kv) and X-ay powder diffraction (XRD) were used to characterize the obtained BaTiO$_3$ nanocrystals. To prepare TEM samples, a crop of dilute BaTiO$_3$ nanocrystal toluene solution was casted on a carbon-coated copper TEM grid (400 mesh) and allowed to dry in air. For XRD samples, concentrated BaTiO$_3$ nanocrystal toluene suspension was drop-casted on the Si wafer and dried to form a thin film.

As can be seen from the example, the Applicants have developed a one pot thermal decomposition approach to synthesize, in this particular instance, barium titanate with well-controlled shape.

In terms of the shape as represented in the table in the specification transmission electromicroscopy was used to characterize the size and shape obtained of barium titanate crystals and X-ray powder diffraction was used to confirm the crystalline nature of the as-obtained barium titanate nanocrystals.

While the guidelines in the table are believed sufficient, generally if the mole ratio of the stabilizer surfactant such as oleic acid to the metal alkoxide precursor is within the range of 6:1 to 16:1 nanomarbles are formed, if the ratio is from about 16:1 to 32:1 nanorods are formed, and if the ratio is 32:1 or greater nanowires are the predominant shape formed.

As can be seen from the above specification and illustrative example, the invention accomplishes its primary objection but its limitation is based upon the claims which follow.

What is claimed is:

1. In the process of forming ferroelectric nanocrystals from thermal decomposition of metal oxide precursors in the presence of an organic surfactant acting as a coordinating ligand, seleceted from the group consisting of oleic acid, stearic acid, and other fatty acid derived surfactants in a non-coordinating organic solvent, the improvement comprising:
    controlling the shape of the produced ferroelectric particles by selectively adjusting the molar ratio of organic surfactant stabilizer to metal oxide precursor.

2. The process of claim 1 wherein the ferroelectric oxide is selected from the group consisting of BaTiO$_3$, Pb(Zr,Ti)O$_3$ and (Ba,Sr)—TiO$_3$.

3. The Process of claim 2 wherein the ferroelectric oxide is BaTiO$_3$.

4. The process of claim 1 wherein the metal alkoxide precursor is a barium metal alkoxide precursor.

5. The process of claim 4 wherein the alkoxide metal precursor is barium titanium ethyl hexano-isopropoxide.

6. The process of claim 1 wherein the mole ratio of organic surfactant stabilizer: metal alkoxide precursor is adjusted within the range of 6:1 to 16:1 to provide predominantly nanomarble shaped ferroelectric oxide particles.

7. The process of claim 1 wherein the mole ratio of organic surfactant stabilizer: metal alkoxide precursor is adjusted within the range of 16:1 to 32:1 to provide predominantly nanorod shaped particles.

8. The process of claim 1 wherein the mole ratio of organic surfactant stabilizer: metal alkoxide precursor is adjusted to 32:1 or greater to provide predominantly nanowire shaped particles.

* * * * *

UNITED STATES PATENT AND TRADEMARK OFFICE
CERTIFICATE OF CORRECTION

| | | |
|---|---|---|
| PATENT NO. | : 9,051,180 B2 | Page 1 of 1 |
| APPLICATION NO. | : 13/171021 | |
| DATED | : June 9, 2015 | |
| INVENTOR(S) | : Lin et al. | |

It is certified that error appears in the above-identified patent and that said Letters Patent is hereby corrected as shown below:

Title page, Inventor Name Item (12):
DELETE "Zhiqun et al"
ADD --Lin et al.--

Signed and Sealed this
Fifteenth Day of December, 2015

Michelle K. Lee
*Director of the United States Patent and Trademark Office*

UNITED STATES PATENT AND TRADEMARK OFFICE
CERTIFICATE OF CORRECTION

PATENT NO.        : 9,051,180 B2
APPLICATION NO.   : 13/171021
DATED             : June 9, 2015
INVENTOR(S)       : Lin et al.

Page 1 of 1

It is certified that error appears in the above-identified patent and that said Letters Patent is hereby corrected as shown below:

Title page, Inventor Name Item (12):
DELETE "Zhiqun et al"
ADD --Lin et al.--

In Item (75), Inventors: delete "Lin Zhiqun", and insert --Zhiqun Lin--

This certificate supersedes the Certificate of Correction issued November 17, 2015.

Signed and Sealed this
Fifth Day of January, 2016

Michelle K. Lee
*Director of the United States Patent and Trademark Office*